Jan. 19, 1954    A. E. CHISHOLM    2,666,605
SHOCK ABSORBING CABLE HANGER
Filed June 18, 1949

INVENTOR
ALLEN E. CHISHOLM
BY
G. F. McDougall
ATTORNEY

Patented Jan. 19, 1954

2,666,605

UNITED STATES PATENT OFFICE 2,666,605

SHOCK ABSORBING CABLE HANGER

Allen E. Chisholm, Portland, Oreg.

Application June 18, 1949, Serial No. 99,979

7 Claims. (Cl. 248—63)

This specification is a disclosure of a cable hanger that absorbs the vibrations and their accompanying stresses at the nearest support, such as a cable tower forming a part of a long distance transmission line, rather than permitting such vibrations to set up harmonics that multiply the ill effects of such reactions to natural phenomena to which a cable span is subject. I have called it a shock absorbing cable hanger to distinguish it from the current cable hanging art structures.

The broad object of the invention herein is to provide an improved cable hanger which serves to dampen and absorb the varied and complicated vibrations always present in such lines and which tend always to attack the cable at abutments, thus preventing cable material fatigue.

Another object is to provide an improved suspension cable hanger which is devoid of abutments or the like against which vibration waves can beat.

A further object is to so provide an improved suspension cable hanger that vibration waves of whatever magnitude and which are the result of various natural conditions or phenomena, are so damped by the invention that vibration harmonics do not resonate.

The summation of the above stated objects may be said to be to supply to the art of cable suspension, a shock-absorbing equilibrant-hanger, to create an adequate name, that automatically responds to conditions that normally interfere with equilibrium; to maintain that equilibrium under which conditions destructive cable fatigue cannot occur.

The foregoing and other objects that will be clear to those skilled in the art and science of constructing transmission structures, are to be found in the specification, infra, and are particularly pointed out in the claims.

Drawings accompany and form a part hereof in which.

Figure 1:
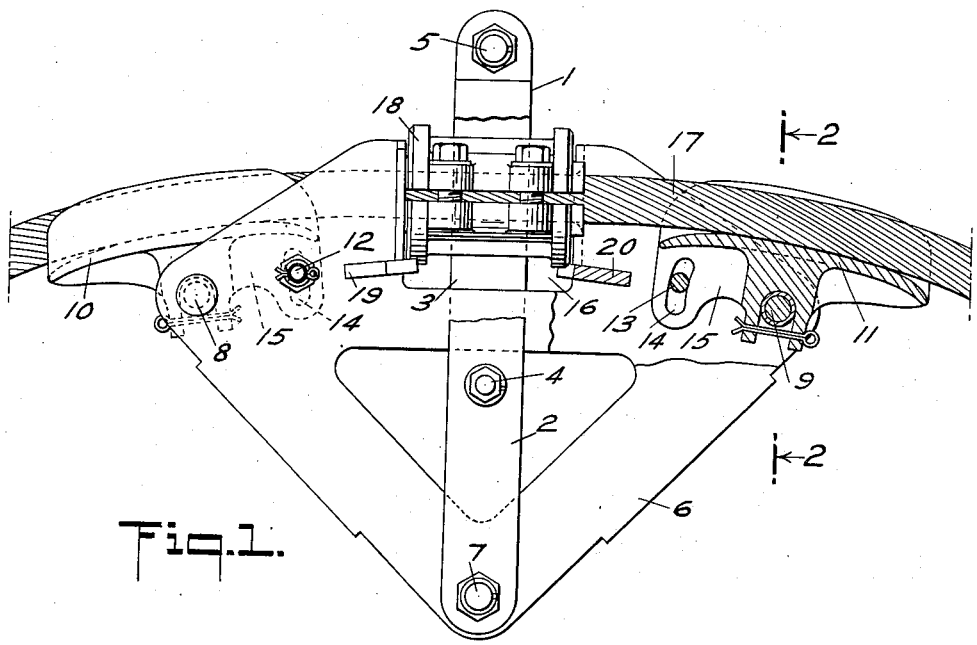
Fig. 1 is a side elevation of the suspension hanger of the invention.
Figure 2:
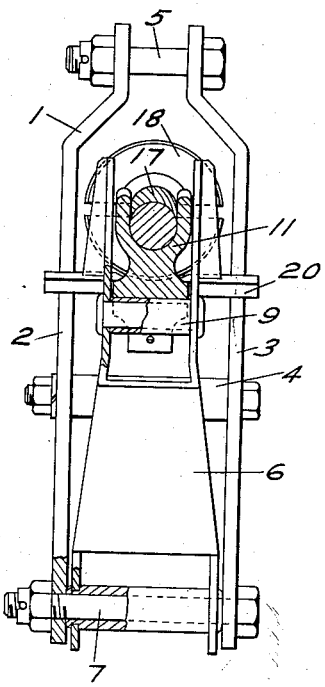
Fig. 2 is a section taken on the plane 2—2 of Fig. 1.

Explaining the drawings in greater detail. A drop hanger 1 comprises a pair of offset elongated limbs or sides 2 and 3, suitably supported in spaced relative position as by the distance piece 4. The drop hanger 1 will be swingably suspended from an arm of a tower or like structure, not shown, indirectly by the bolt 5, with provision for insulators, also not shown, between the bolt 5 and the arm of the tower. Said bolt 5 is to be considered the ultimate pivotal support of the hanger as a unitary structure.

Between the limbs of the drop hanger 1 is a notched structure of unequal pentagon shape, which is the primary cable support structure, in the form of a shell with similar sides 6. The shell 6 is pivotally supported or fulcrumed between the limbs 2 and 3 on the pivot or bearing member 7 which will carry the entire load of a cable imposed on the shell 6, indirectly, as will be explained. At opposite sides of the shell 6 are pivots or fulcrums 8 and 9 upon which cable chairs 10 and 11 are mounted in unstable equilibrium. Cable chairs 10 and 11 are shown having a body portion grooved to accommodate the size of cable to be supported and comprise secondary load supporting means.

The chair mountings 8 and 9 will be equidistant from the vertical axis of the drop hanger 1, on opposite sides thereof, when the shell 6 is in mid position between the limbs 2 and 3 of the drop hanger 1, as shown. The cable grooved chairs 10 and 11, are arcuate as to their grooved boundaries and have a limited swinging or rocking movement on their respective pivot mountings 8 and 9 by reason of the limit pins 12 and 13 that project through arcuate elongated openings 14 in the web portion 15 of each chair. It will be noted that the depending web 15 comprises a thickened portion containing a fulcrum on which the chairs are supported.

The notch 16 of the shell 6 is of requisite depth so that when a cable such as 17 rests in the supports 10 and 11, a spool clamp 18 may grip the cable 17 with its axis coincident with the longitudinal axis of the cable 17. It is thus seen that the spool clamp 18 is merely a cable locating instrument and carries no cable weight or stress whatever, being freely floating vertically, and by rocking of the shell 6 and/or the chairs 10 and 11, it is capable of limited longitudinal motion.

The shell 6 is tied together strongly by the through tie-plates 19 and 20, which limit longitudinal swinging of the shell 6 in case of cable breakage, as they extend past the limbs 2 and 3 of the drop hanger 1. They impose no limit in normal operation.

The best way to realize the advantages of the invention and develop the proper mode of operation will now be described. A length of cable will be supported by plural towers provided with plural cable hangers of the kind described, both ends of the cable dead-ended, the hangers on a series of towers positioned so they are vertical, the shell 6 and the chairs 10 and 11 in mid-position, when it will be observed that the load carrying part of the shell 6 is an isosceles triangle with the longer axis defined by the pivots 8 and 9 and the shorter axis coincident with the axis of the hanger as a whole.

The load is carried at the apex of the triangle, at pivot 7. The load is superposed on the supports pivoted at the ends of the major axis of the triangle and the load must find ultimate support on the pivot 7, which support is in unstable equilibrium. However, since the downward pressure of the cable on the supports is due to substantially equal catenaries on opposite sides of the tower, the ultimate support, the hanger, is vertical and each span comprises a loop with spaced nodal points at the grooved chairs of each hanger, the nodal points being separated by the distance apart of the pivots 8 and 9 of each hanger. Vibration phenomena, of whatver volume or origin, is transmitted to the grooved chairs and the forces generated in consequence act unequally on the chairs, tending to oppose or to augment the downward pressure on the chairs.

If instantaneous vibration force in a span is plus (downward) at a chair, the chair yields and to yield must raise the opposite chair, whereupon the weight of the adjacent span bearing on the opposite chair opposes such movement and instead of the otherwise destructive force, which in an unyielding hanger is expressed as bending moment, the vibration shock is absorbed by opposing forces in adjacent spans. We cannot of course destroy the energy but preserve it unchanged as practically pure tension, which the cable is well able to withstand.

The word triangle, as used in the claims, refers to imaginary lines closing the area inside the load carrying pivots such as 7, 8 and 9 and not to the external form of the member such as 6 in which such pivots are mounted Having described my invention so that those familiar with long distance transmission line problems and constructions can make use of it, what I claim as new and desire to secure by Letters Patent, is:

1. A shock absorbing cable hanger for supporting a conductor cable comprising a drop hanger provided with pivotal mounting means adjacent to one end thereof for use in supporting said hanger, a primary load supporting member comprising a generally triangular shaped cable carrier having an apex portion and an elongated base extending along the side of said cable carrier opposite said apex portion, pivotal securing means located adjacent to the other end of said drop hanger hingedly connecting the apex portion of said cable carrier and said drop hanger with the elongated base thereof positioned above said apex, and a secondary load supporting means comprising a plurality of cable chairs, one of which is pivotally mounted adjacent to each of the ends of said elongated base of said cable carrier.

2. A shock absorbing cable hanger for supporting a conductor cable comprising a drop hanger provided with pivotal mounting means adjacent to one end thereof for use in supporting said hanger, a primary load supporting member comprising a generally triangular shaped cable carrier having an apex portion and an elongated base extending along the side of said cable carrier opposite said apex portion, pivotal securing means located adjacent to the other end of said drop hanger hingedly connecting the apex portion of said cable carrier and said drop hanger with the elongated base thereof positioned above said apex, and a secondary load supporting means comprising a plurality of cable chairs each of which is provided with a cable receiving groove in the upper surface thereof and a bearing fulcrum positioned beneath said surface, and bearing members located adjacent to each of the ends of said elongated base coacting respectfully with the bearing fulcrums of each of said cable chairs to rockingly support in spaced relation said cable chairs on said cable carrier with the cable receiving groove directed upwardly.

3. A shock absorbing cable hanger for supporting a conductor cable comprising a drop hanger provided with pivotal mounting means adjacent to one end thereof for use in supporting said hanger and a bearing member located a spaced distance from said mounting means, a primary load supporting member comprising a generally triangular shaped cable carrier having an apex portion and an elongated base extending along the side of said cable carrier opposite said apex portion, said apex portion being journalled on said bearing member with the base positioned above said apex, secondary load supporting means comprising a plurality of cable chairs, one of which is positioned adjacent each of the ends of said elongated base, said cable chairs each comprising a body portion formed with a cable receiving groove in the upper portion thereof and a web element depending therefrom, and spaced apart hinges connecting said depending web elements of each of said cable chairs and the elongated base of said cable carrier.

4. A shock absorbing cable hanger for supporting a conductor cable comprising a drop hanger provided with pivotal mounting means adjacent to one end thereof for use in supporting said hanger and a bearing member located a spaced distance from said mounting means, a primary load supporting member comprising a generally triangular shaped cable carrier having an apex portion and an elongated base extending along the side of said cable carrier opposite said apex portion, said apex portion being journalled on said bearing member with the elongated base positioned above said apex, secondary load supporting means comprising a plurality of cable chairs, one of which is positioned adjacent each of the ends of said elongated base, said cable chairs each comprising a body portion formed with a cable receiving groove in the upper portion thereof and a web element depending therefrom, spaced apart hinges connecting said depending web elements of each of said cable chairs and the elongated base of said cable carrier, and means for limiting the movement of said cable chairs about said hinges.

5. A shock absorbing cable hanger for supporting a conductor cable having a clamp secured thereto, comprising a drop hanger provided with mounting means adjacent to one end thereof for use in supporting said hanger and a bearing member located a spaced distance from said mounting means, a primary load supporting member comprising a generally triangular shaped cable carrier having an apex portion and an elongated base extending along the side of said load carrier opposite said apex portion, said apex portion being journalled on said bearing member with the elongated base positioned above said apex, secondary load supporting means comprising a plurality of cable chairs, each of which comprises a body portion formed with a cable receiving groove in the upper portion thereof and a web element depending therefrom, hinges located adjacent the ends of said elongated base connecting said depending web elements of each of said cable chairs and the elongated base of said cable carrier, and a notch formed within the upper edge of said cable carrier intermediate said cable chairs adapted to receive said clamp therein.

6. A shock absorbing cable hanger for supporting a conductor cable comprising a drop hanger formed of two elongated members disposed in spaced relation, an element extending through and between said elongated members adjacent one end thereof for use in supporting said hanger, a bearing member extending between said spaced members located a spaced distance from said element, a primary load supporting member comprising a cable carrier which comprises a shell formed of side members in spaced apart relation provided with three bearing fulcrums located in triangular configuration on said shell, one of said bearing fulcrums positioned at the apex of said triangular configuration and the other two bearing fulcrums positioned adjacent opposite ends of the base of said triangular configuration, said bearing fulcrum located at the apex of said triangular configuration coacting with said bearing member to support said cable carrier between said elongated members and to rockingly support said cable carrier with the remaining two bearing fulcrums above said bearing member, a secondary load supporting means comprising a plurality of cable chairs each of which comprises a body portion formed with a cable receiving groove in the upper position thereof and a bearing element positioned beneath said upper surface, the bearing elements of said cable chairs coacting respectively with said bearing fulcrums positioned adjacent the ends of the base of said triangular configuration to rockingly support said cable chairs in spaced relation upon said cable carrier.

7. A shock absorbing cable hanger for supporting a conductor cable having a spool clamp secured thereto, comprising a drop hanger formed of two elongated members disposed in spaced relation, a bolt extending through and between said elongated members adjacent one end thereof for use in supporting said hanger, a bearing member extending between said spaced members located a spaced distance from said bolt, a primary load supporting member comprising a cable carrier which comprises a shell formed of side members in spaced apart relation provided with three bearing fulcrums located in triangular configuration on said shell, one of said bearing fulcrums positioned at the apex of said triangular configuration and the other two bearing fulcrums positioned adjacent opposite ends of the base of said configuration, said bearing fulcrum located at the apex of said triangular configuration coacting with said bearing member to support said cable carrier between said elongated members and to rockingly support said cable carrier with the remaining two bearing fulcrums above said bearing member, a secondary load supporting means comprising a plurality of cable chairs each of which comprises a body portion formed with a cable receiving groove in the upper portion thereof and a bearing element positioned beneath said upper surface, the bearing elements of said cable chairs coacting respectively with said bearing fulcrums positioned adjacent the ends of the base of said triangular configuration to rockingly support said cable chairs in spaced relation upon said cable carrier with the cable receiving grooves directed upwardly, and a notch formed within the upper edge of said shell intermediate said cable chairs adapted to receive said clamp therein.

ALLEN E. CHISHOLM.

References Cited in the file of this patent

UNITED STATES PATENTS

| Number | Name | Date |
| --- | --- | --- |
| 1,871,350 | Wahlberg | Aug. 9, 1932 |
| 1,973,556 | Bolser | Sept. 11, 1934 |
| 2,062,283 | Austin | Dec. 1, 1936 |
| 2,086,927 | Talbott | July 13, 1937 |
| 2,488,322 | Ownbey et al. | Nov. 15, 1949 |

FOREIGN PATENTS

| Number | Country | Date |
| --- | --- | --- |
| 805,800 | France | Nov. 28, 1936 |